United States Patent
Philipp

(10) Patent No.: US 7,178,658 B2
(45) Date of Patent: Feb. 20, 2007

(54) ARTICLE STORE

(75) Inventor: Kurt Philipp, Grenzach-Wyhlen (CH)

(73) Assignee: Rotzinger AG (CH)

( * ) Notice: Subject to any disclaimer, the term of this patent is extended or adjusted under 35 U.S.C. 154(b) by 0 days.

(21) Appl. No.: 11/441,361

(22) Filed: May 25, 2006

(65) Prior Publication Data

US 2006/0266619 A1 Nov. 30, 2006

(30) Foreign Application Priority Data

May 26, 2005 (CH) .................... 0902/05

(51) Int. Cl.
*B65G 37/00* (2006.01)
(52) U.S. Cl. .................... 198/347.1; 198/812
(58) Field of Classification Search ............. 198/347.1, 198/588, 812, 799, 800, 347.2, 347.3
See application file for complete search history.

(56) References Cited

U.S. PATENT DOCUMENTS

| | | | | |
|---|---|---|---|---|
| 2,932,376 A | * | 4/1960 | Millington | 198/812 |
| 3,053,378 A | * | 9/1962 | Longenecker | 198/812 |
| 5,322,154 A | * | 6/1994 | Lenherr | 198/460.2 |
| 5,960,927 A | * | 10/1999 | Bahr | 198/347.1 |
| 6,250,454 B1 | * | 6/2001 | Douglas | 198/347.1 |
| 6,591,963 B2 | * | 7/2003 | Wipf | 198/812 |
| 6,640,960 B1 | * | 11/2003 | Spettl | 198/347.1 |
| 6,820,732 B2 | * | 11/2004 | Guidetti | 198/347.1 |
| 2003/0234601 A1 | | 12/2003 | Spettl | |

FOREIGN PATENT DOCUMENTS

| | | |
|---|---|---|
| EP | 1331181 A1 | 3/2005 |
| GB | 2124574 A | 2/1984 |
| WO | WO 2005/028345 A1 | 3/2005 |

\* cited by examiner

*Primary Examiner*—James R. Bidwell
(74) *Attorney, Agent, or Firm*—Hammer & Hanf, P.C.

(57) ABSTRACT

The store arranged between production and packaging having an endless, circulating pair of chains on which the product-carrying gondolas are suspended for swinging action. The pair of chains, which are guided on a vertical section and on a horizontal section, are guided over an upper deflecting arrangement and a lower deflecting arrangement. Each deflecting arrangement is mounted so it can be displaced in a linear guide. A tensioning cable has its ends fastened on the two deflecting arrangements and keeps the pair of chains tensioned in each operating position. As they pass through the upper deflecting region, the filled gondolas are deflected radially by crank-like suspension mechanisms arranged on both sides, so adjacent gondolas can be operated with spacing between them, which in the vertical regions of the gondola path, corresponds to the spacing between two adjacent shelves.

9 Claims, 4 Drawing Sheets

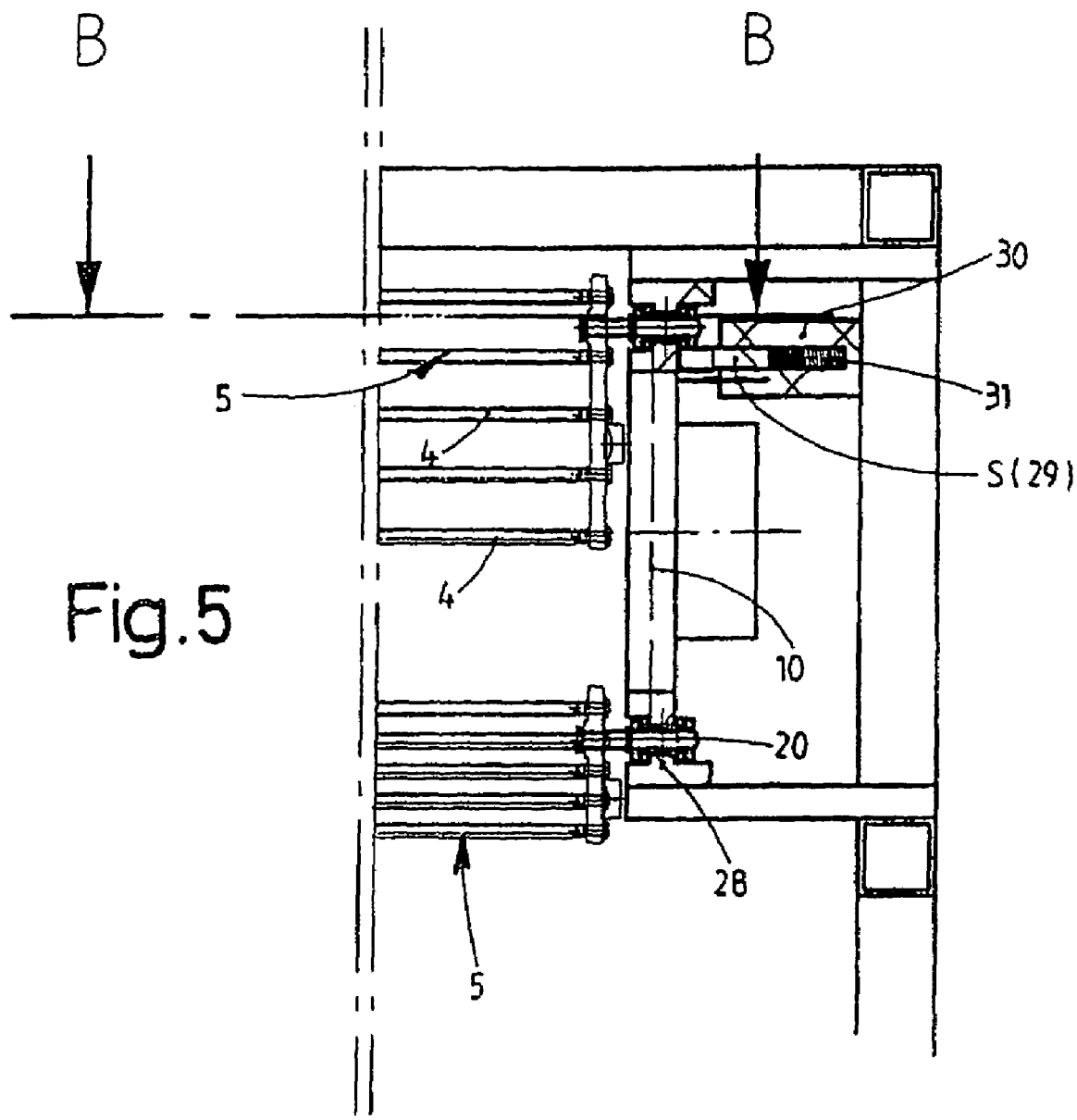

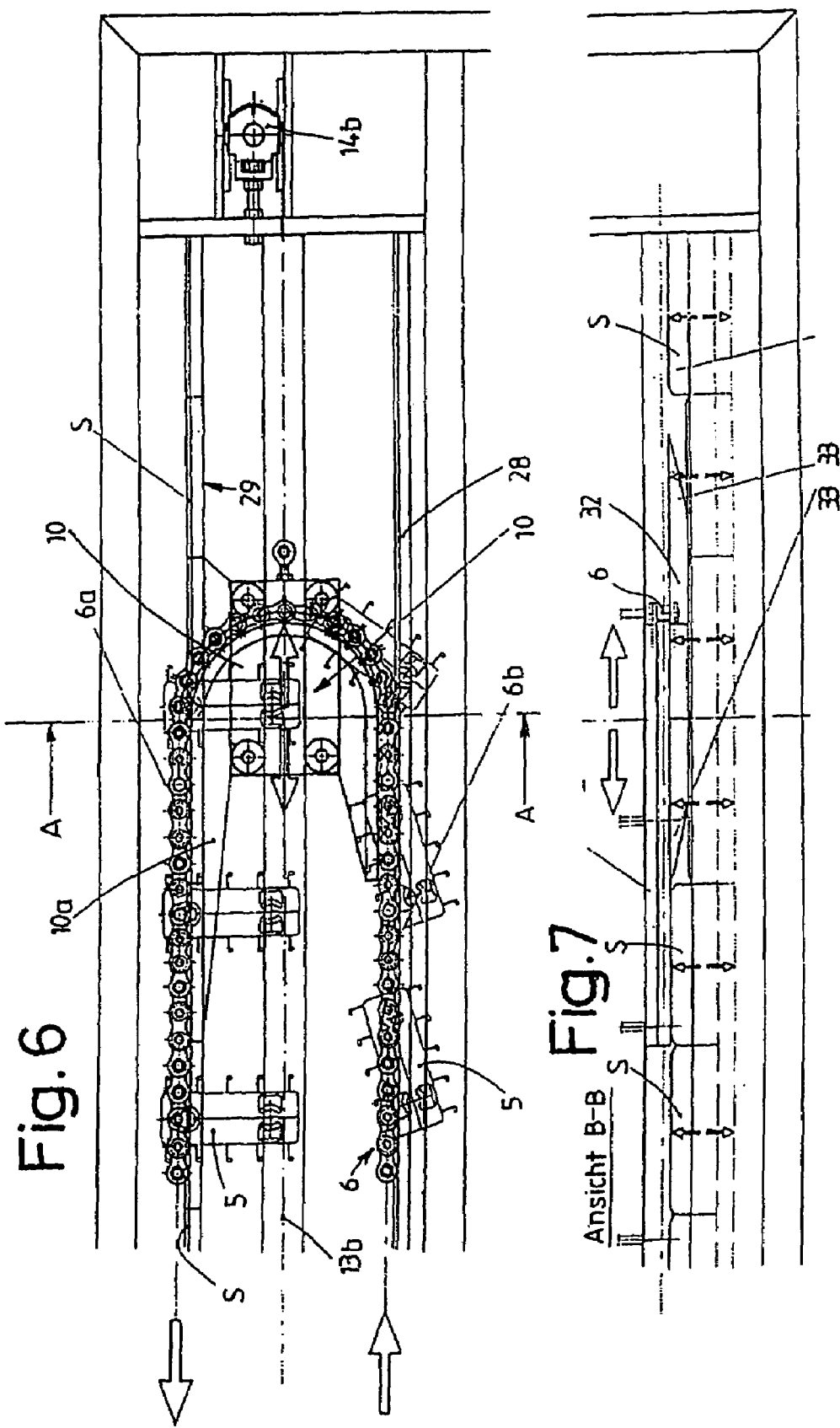

ARTICLE STORE

BACKGROUND OF THE INVENTION

The present invention relates to an article store and to a deflecting arrangement for the article store.

Such article stores are known to be incorporated between production and packaging, in order to form a buffer zone in the event of operation being disrupted during production and/or packaging. The products, e.g. chocolate bars with or without packaging, which are supplied in rows by an entry conveyor are optimally intended to be fed to the packaging machines continuously and without any gaps between them.

British Patent Application GB 2 124 574 A presents an article store which is arranged as a buffer zone between two processing apparatuses and has a vertical section and a horizontal section in each case. A vertically or horizontally displaceable deflecting arrangement is arranged here at the end of each section. The deflecting arrangements are connected to one another by means of a tensioning mechanism such that they can only be displaced together when the chain tensioning is maintained.

In this case, the two chains are equipped individually with "article holders". These article holders are fastened rigidly, i.e. in a non-rotatable manner, on the chains, so that the products located on the article holders are caused, by the system, to change position in the region of the chain-deflecting means. They are completely upended here, i.e. turned through 180°, which of course, in the case of products lying loosely on shelves, is not an option since such products, i.e. chocolate bars, have to remain in position all the way from loading to unloading.

Furthermore, the apparatus described in British Patent Application GB 2 124 574 requires detectors 7a, 7b, 7c in order to establish where the carriage which carries the articles is located at present. This operation of establishing the current carriage position is important in order to be aware of the filling state of the store and to know when the store is empty or full.

It is also the case that the known designs, for example according to European Patent Application EP 1 331 181 A1, do not take account of the fact that, as they pass the deflecting arrangements, the gondolas loaded with shelves have to operate with a relatively large spacing between them in order that collisions between adjacent gondolas can be reliably avoided. However, this vastly reduces the amount of storage space available. Since the conveying chains, furthermore, have to cover the capacity-reducing distances between the gondolas, it is thus also the case that the loading-cycle and unloading-cycle rate is reduced to a considerable extent.

The object of the present invention is to eliminate these disadvantages of the main apparatuses and to propose an article store and a deflecting arrangement for an endless, driven pair of chains which serves for transporting articles, is arranged on a common axis and on which the articles which are to be transported are suspended in gondolas which are mounted for swinging action. One aim of the present invention is to allow the gondolas to follow immediately one after the other, i.e. at a spacing which is appropriate for cyclic operation and, in the vertical regions of the gondola path, corresponds to the spacing between adjacent shelves, so that there is no need to provide any specific step in between in order to bridge the spacings between the gondolas. A further aim of the present invention, in addition, is to manage with a fraction, e.g. a third, of the chain length in comparison with the conventional stores having a similar storage capacity and to improve the cycle rates for loading and unloading to a considerable extent, i.e. more or less to double them. This measure, furthermore, results in a considerable reduction in costs for set-up and installation.

This object is achieved, thanks to the present invention, by the combination of features defined in specification.

BRIEF DESCRIPTION OF THE DRAWINGS

An exemplary embodiment of the invention is described hereinbelow with reference to the attached drawing, in which:

FIG. 5 shows a section along line A—A in FIG. 6, FIG. 6 shows a side view of the chain-deflecting means of the horizontal chain section, and FIG. 7 shows the view along line B—B in FIG. 5.

DETAILED DESCRIPTION OF THE INVENTION

Figure 1:
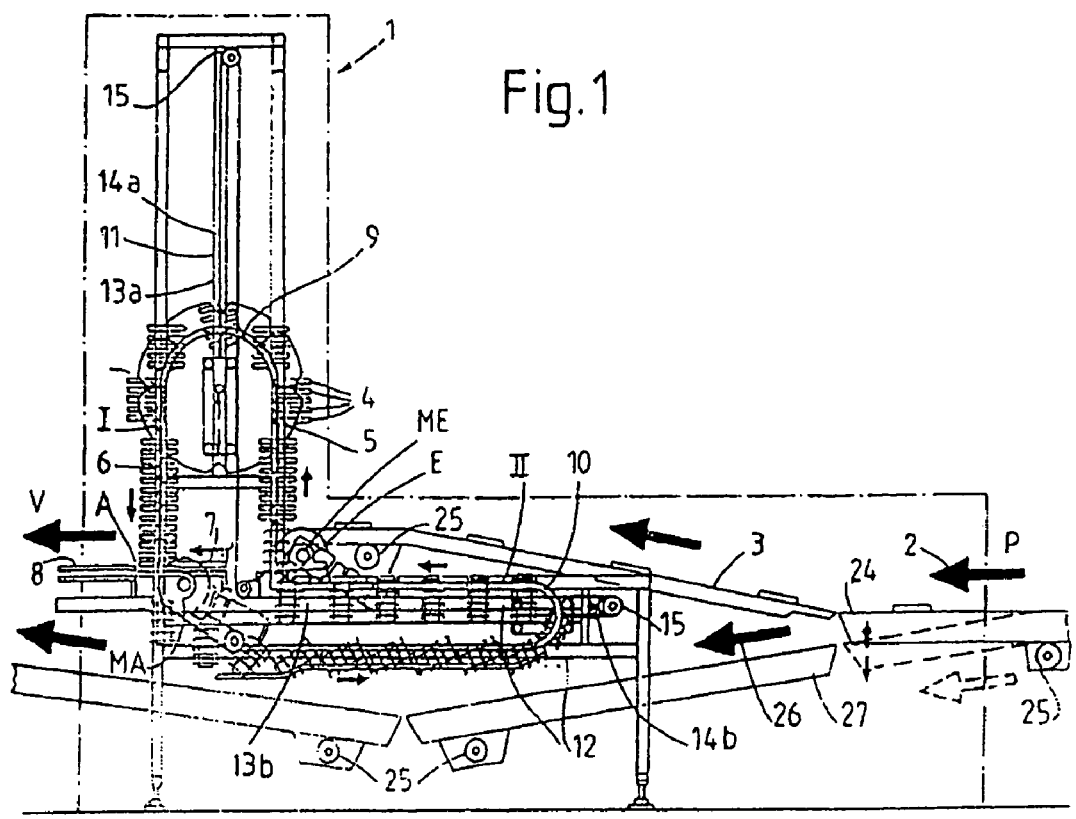
FIG. 1 shows a side view of one embodiment of an article store provided with a deflecting arrangement according to the invention.
Figure 2:
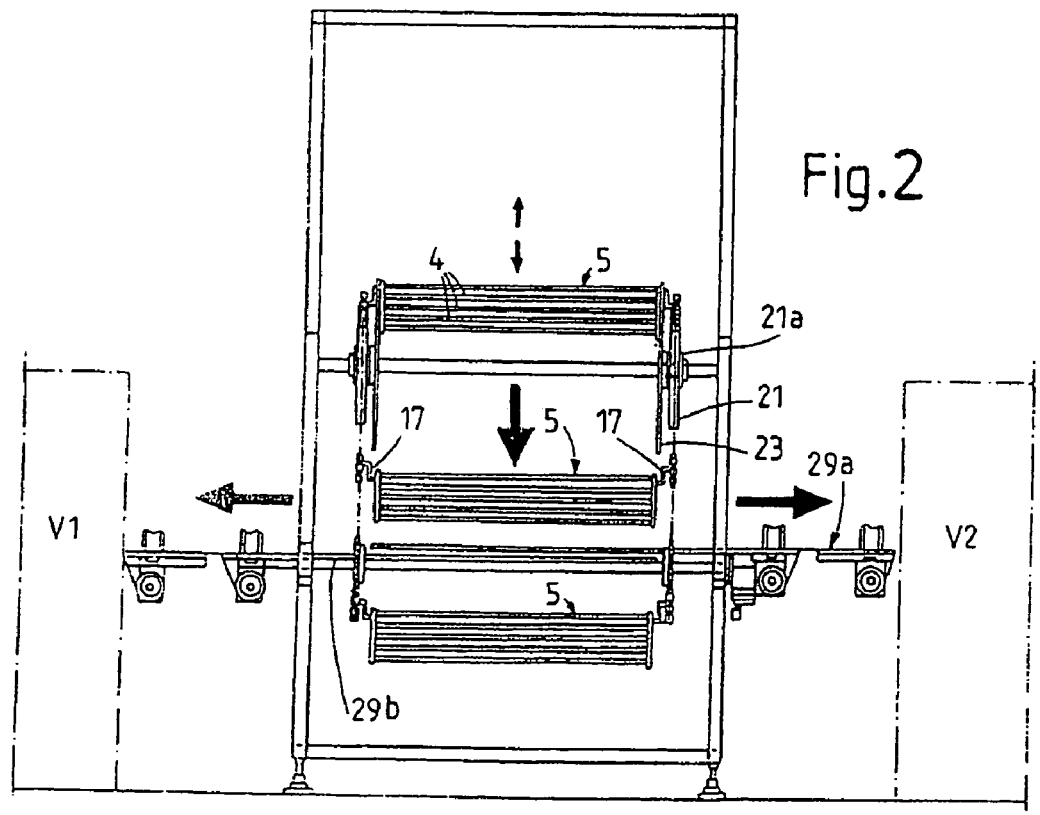
FIG. 2 shows a front view, from the unloading side, of this article store.

FIG. 1 shows a simplified illustration of an article store which is designated 1 overall and is incorporated between a production location P and one or more packaging machines V. The articles, which are supplied on a loading path 3, in the direction of the arrow 2, from the production location P, for example an installation for the continuous production of chocolate bars with or without packaging, are pushed at the entry E to the store, via a known arrangement, onto the shelves 4 of a gondola 5, which is moved past the entry in time with the loading cycle, and are conveyed by the gondolas 5 to the exit A. There, the gondolas are conveyed, via a pusher 7, onto a belt 8 and then directed to the packaging machines V. As can be seen from FIG. 1, the pusher 7 may have two pushing-out members which are arranged one above the other and by means of which the contents of two respective shelves can be pushed onto available conveying belts.

An endless, circulating pair of chains 6 is provided, over its entire length, with gondolas 5 which are suspended on the chains 6 for swinging action on both sides by means of a suspension arrangement, which is yet to be described. As FIG. 1 also shows, the pair of chains 6 runs through both a vertical section I and a horizontal section II. In order to achieve this, the endless pair of chains 6 is guided over an upper deflecting arrangement 9 and a lower deflecting arrangement 10. The two deflecting arrangements 9 and 10 are guided in respective guides 11, 12 such that, as required, the lower deflecting arrangement 10 can be displaced in a horizontal direction and the upper deflecting arrangement 9 can be displaced correspondingly in the vertical direction. The guides 11 and 12 may be designed, for example, as pairs of sliding jaws which can move along a vertical rail 13a or a horizontal rail 13b, respectively. As can also be gathered from the following description, the two sections I and II, which constitute the respective vertical and horizontal gondola-guiding regions, are usually moving continuously, depending on the type of operation in each case, so that their lengths can also change continuously in adaptation to the respective storage situation.

In order to keep the displaceably mounted deflecting arrangements 9 and 10 at the correct spacing apart, and under tensioning, in each operating phase, a tensioning arrangement is provided. For this purpose, one end of a tensioning cable 14a (FIG. 1) is fastened on the upper deflecting arrangement 9, this deflecting cable being guided, over deflecting rollers 15, to the lower deflecting arrangement 10 and likewise being secured thereon. In the case of the configuration which is illustrated in FIG. 1, the cable 14a is fastened on the adjustment spindle 14b, which is fixed in place such that it can be rotated, at the right-hand end of the horizontal section II, via the deflecting roller 15 there. Instead of a tensioning cable 14a, a chain may also be used as tensioning arrangement. The tensioning which is necessary for this purpose can be ensured, for example, via a spring or by means of weights fitted at the ends of the tensioning arrangement. A correction in tensioning which may occasionally be necessary can take place via the adjustable spindle 14b, which acts on the tensioning arrangement.

The double function of the tensioning means, i.e. in the case of the exemplary embodiment of the tensioning cable, thus consists, on the one hand, in the mechanical coupling of the two deflecting arrangements 9 and 10 and, on the other hand, in maintaining the chain tensioning. The chain 6 and cable 14a supplement one another to the extent where the pair of chains 6 encloses the two deflecting arrangements 9 and 10, and tries to keep them together, while the tensioning cable 14a tries to draw the two deflecting arrangements 9 and 10 apart from one another in order thus to keep the chain tensioned.

Since the pair of chains 6 has two identical, endless chains, it is, of course, the case that whatever is said in respect of one chain and the deflecting arrangement thereof also applies to the other chain.

For the purpose of driving the two endless chains 6, an entry drive ME is arranged on the entry side and an exit drive MA is arranged on the exit side. The two drives ME and MA are controlled by a central control unit such that they advance the gondolas 5 in steps, from shelf to shelf, via the pair of chains 6. By means of the two drives ME and MA, the entire path covered by the gondolas 5 is thus subdivided into the two abovementioned sections I and II, so that in each case only filled gondolas 5 circulate above the entry/exit plane and only empty gondolas 5 circulate beneath the same.

The operating behaviour of this abovedescribed article store can best be described if distinctions are made between the following operating phases:

1. When the store is empty, i.e. when the gondolas 5 are located in the as yet unfilled state in the inactive zone, which in this case also takes in part of the vertical section I, then the two deflecting arrangements 9 and 10 are located in the position which is illustrated in FIG. 1. The upper deflecting arrangement 9 has thus reached its lowermost end position, and the lower deflecting arrangement 10 has reached its extreme right-hand end position. If, then, the gondolas 5 are loaded at the entry E and the gondolas are unloaded with the same timing at the exit A, the gondolas are advanced in steps over their entire path, by means of the pair of chains 6, without the two deflecting arrangements 9 and 10 leaving their end position.

2. If a bottleneck, which may be caused by a packaging machine being defective, then forms, for exampled at the exit A, unloading at the exit is temporarily not possible. However, since operation continues with the loading cycle at the entry E, the lower deflecting arrangement 10 is drawn to the left and the pair of chains 6 which is blocked at the exit is forced to move upwards by way of the deflecting arrangement 9, this creating space for filled gondolas in the upper region. This operation continues until all the gondolas 5 fill the upper vertical region. By virtue of the tensioning cable 14a, the pair of chains remains tensioned and the two deflecting arrangements 9 and 10 maintain their spacing apart from one another.

3. If, in contrast, there is disruption at the entry E, then the pair of chains 6 is blocked on the loading side and then conveys the full gondolas 5 past the exit, where they are unloaded in the unloading cycle and then moved into the lower, inactive zone, which is located in the horizontal region. This unloading operation is then continued until virtually all the gondolas have been emptied and have collected in the inactive zone.

4. Since, then, the store has operated both on the loading side—at the entry E—and on the unloading side—at the exit A—with two separately controlled drives ME and MA, different cycle rates can be used, depending on requirements, at the two locations. This means that the deflecting arrangement 9 is moved upwards in the case of a predominant loading-cycle rate occurring at the entry E, and downwards in the case of a predominant unloading-cycle rate occurring at the exit A, and the deflecting arrangement 10 accompanies this movement correspondingly.

The deflection of the pair of chains gives rise to the situation, in accordance with the law of the block-and-tackle roller, where the deflecting arrangements 9 and 10 always move synchronously, with half the difference in cycle rates, in the direction of the greater operating speed prevailing at the entry E or at the exit A. According to FIG. 1, the empty gondolas 5 fill the lower horizontal region (section II) and part of the upper vertical region (section I).

Figure 3:
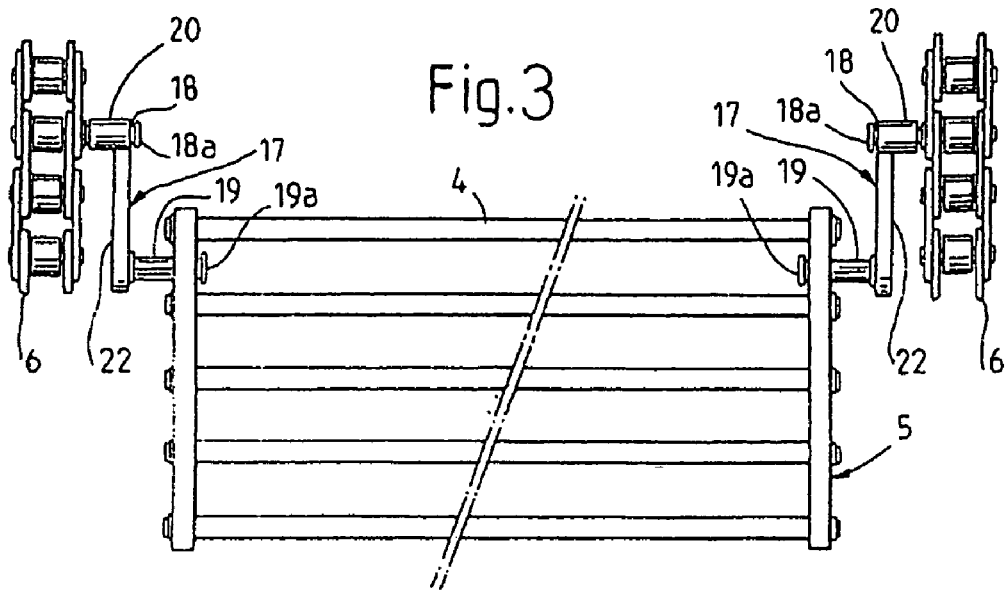
FIG. 3 shows, on a larger scale, a simplified illustration of a gondola and the means of suspending it.

It has already been mentioned in the introduction that, up until now, the spacing between adjacent gondolas 5 had to be considerably greater than the spacing between two adjacent shelves 4 of a gondola 5, in order to avoid the undesirable collisions between filled gondolas. These collisions inevitably occur, in view of short spacings between gondolas, when the gondolas pass the deflecting arrangement and start to rock as a result of the unavoidable accelerations. Since the products, in many cases, project beyond the dimensions of the shelves, up until now, the product length was the critical determining factor for the minimum spacing between the gondolas in relation to the diameter of the chain wheels in the deflecting region. In respect of reducing the spacing between the gondolas to the spacing between adjacent shelves corresponding to the operating cycle, the following gondola-suspension means is thus proposed:

FIG. 3 shows a gondola which is equipped with 5 shelves 4, is suspended for swinging action on the two endless chains 6 on both sides via two coaxial crank-like suspension arrangements 17, and thus couples the chains mechanically. On each of the suspension arrangements 17, it is possible to distinguish between the following individual parts:

the chain-mounted bolt 18, which projects laterally out of the chain 6 and forms an extension of the chain roller, a gondola-mounted bolt 19, which is mounted in a loosely rotatable manner in the side wall of the gondola 5 and is provided with a means 19a for securing it against axial displacement, and a crank arm 22, which is fixedly connected to the gondola-mounted bolt 19 and to a cylindrical bushing 20, which encloses the chain-mounted bolt 18 in a loosely rotatable manner and is likewise secured, via a split pin 18a or some other arresting member, against axial displacement.

In conjunction with this design of the gondola-suspension means, a circular cam plate 23 is connected in a rotationally rigid manner to the chain wheel 21 (FIG. 4) of the upper deflecting arrangement 9, this cam plate projecting beyond the circumference of the chain wheel 21 and being provided with peripheral, prism-like recesses 24 at equal spacings to the crank-articulation locations on the chains 6. As a gondola 5 arrives in the region of this cam plate 23, the suspension arrangement 17, as can be seen from FIG. 4, hangs vertically downwards, i.e. in alignment with the parallel chain, under the influence of the weight of the gondola. During the subsequent upward movement of the gondola, the recess 24 of the rotating cam plate 23 then comes into contact with the gondola-mounted bolt 19 (FIG. 3) and thus deflects the gondola radially outwards by the length a (FIG. 4) of the crank arm 22. The point of suspension of the gondola 5 is thus deflected radially by the extent a. Each gondola thus has a relatively large swinging region available to it as it makes its way over the deflecting arrangement 9. As a result, the spacing between adjacent gondolas 5 can be reduced to the spacing between adjacent shelves 4, and movement through the region between the gondolas can then also take place in time with the loading cycle.

By virtue of the relatively large spacing between adjacent gondolas 5 being avoided, it is then possible for 50% more products to be stored in the same storage space. In addition, double the loading-cycle and unloading-cycle rate is possible since there is no longer any need for the chains to cover any capacity-reducing distances between the gondolas.

Figure 4:
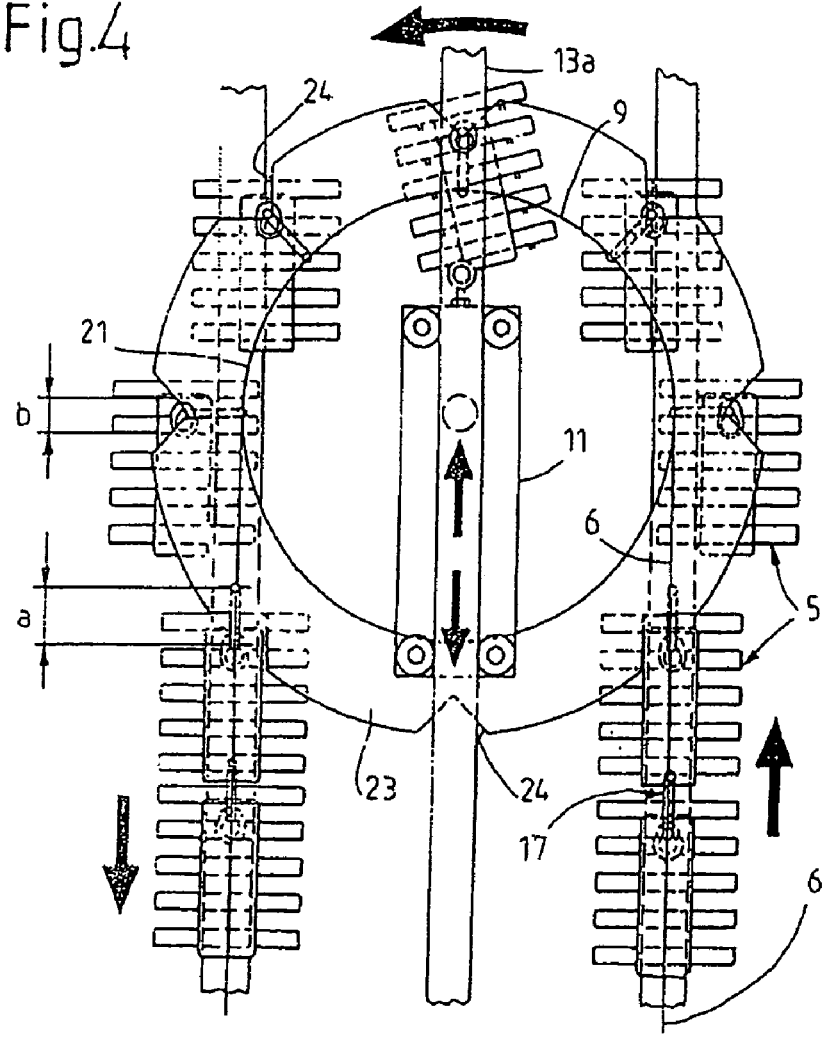
FIG. 4 shows a detail in the region of the upper chain-deflecting means.

As FIG. 4 shows, the gondolas 5 follow one another, during operation of the store, at the spacing b (FIG. 4), which corresponds to the spacing between adjacent shelves 4. It can also clearly be seen in FIG. 4 how the pair of chain wheels 21 is connected in a rotationally rigid manner to the cam plates 23 via hubs 21a.

It has been established, in relation to FIG. 1, that the gondolas 5 are loaded at the entry E with the products, which are supplied, via the loading path 3, in arrow direction 2, coming from production P. In the event where, for operational reasons, the article store is to be bypassed, a bypass arrangement is provided, this allowing the belt 24 coming directly from production P to be pivoted, by means of its pivoting arrangement 25, in the direction of the arrow 26 such that the product is fed to a bypass path 27 and, from the latter, to another article store or for further processing.

By virtue of the straightforward and efficient combination and coupling of the two displaceable chain-deflecting arrangements 9 and 10 and the crank-like gondola-suspension means described above, the abovedescribed store, while having a comparable storage capacity, manages with just a third of the chain length, a third of the closed-in space and approximately half the gondolas. In addition, the loading and unloading speed, i.e. the cycle rate, is double that of the conventional gondola stores. As a result, the costs of such a store are very attractive since much less set-up work is required and the installation costs are also reduced to a considerable extent.

A further embodiment of the idea of the invention is described hereinbelow with reference to FIGS. 5, 6 and 7 of the drawing.

FIG. 6 illustrates the deflecting region of the two endless chains 6 at the end of the horizontal chain guide. The figure shows the deflecting arrangement 10, which can be displaced along the rail 13b, one of the two chains 6, the gondolas 5, hanging on the chains, and the tensioning arrangement 14b, which is necessary for the tensioning cable.

The description of FIG. 1, up until now, has not taken account of the fact that the chain 6 has to be supported, both in its upper strand 6a and its lower strand 6b, in order to avoid sagging. For this purpose, respective supporting profiles 28 and 29 are fitted both in the lower chain strand and in the upper chain strand, and the chain 6 rests in a displaceable manner on these profiles. The upper strand 6a and lower strand 6b always have to be supported in the region of the horizontal chain guide, irrespective of the present position of the chain-deflecting arrangement 10, because the chains can only be properly tensioned if they are not sagging.

This chain support can easily be realized with the lower strand 6b of the chain by a continuous chain-supporting profile 28 being arranged beneath the lower strand, it being possible for the circulating chain to be supported on this profile. In the case of the upper strand 6a of the chain, in contrast, it is not possible to use a continuous chain-supporting profile since the chain, in the upper region of the displaceable chain-deflecting means, has to cross over the chain-supporting profile 29—always coming from beneath—in order for it to be possible for the top strand of the chain to be supported on top of the profile 29.

In order to achieve this, the chain-supporting profile 29 is divided up into moveably mounted segments S which can be moved out of the way, are mounted such that they can be displaced in a guide 30 (FIG. 5) and are retained in position by compression springs 31.

The actuation of the segments S, i.e. the displacement of the latter out of the way of the normal chain guide, takes place by way of directing means 32 (FIG. 7) which are arranged on both sides of the displaceable chain-deflecting means 10 and of which the two end portions are provided with bevels 33. These directing means 32, which are fixedly connected to the chain-deflecting arrangement 10, consequently participate in each displacement movement of the deflecting arrangement 10 and, in order for the chain to pass through to the upper chain-strand region, free a corridor at the precise location where the chain has to penetrate upwards. It is thus the case that a number of the chain-supporting segments S are moved out of the way in both movement directions of the displaceable chain-deflecting means 10 in order that the chain 6, coming from beneath, can cross over the supporting profile 29.

Whereas the segments S of the upper supporting profile 29 are displaced out of the movement region of the chain by the directing means 32, the corresponding portion of the upper chain strand does not have any support. In order also to ensure support for the chain in this—constantly changing—portion, the deflecting arrangement 10 has its upper portion 10a (FIG. 6) extended such that this portion 10a is located directly beneath that part of the chain which is to be supported, and it thus momentarily performs the function of the supporting segments S which have been moved out of the way.

The invention claimed is:

1. An article store as a buffer zone between two processing arrangements, in particular between production and packaging, having an endless, guided pair of chairs on which gondolas, which are intended for temporarily storing the articles and are provided with shelves, are suspended for swinging action, having in each case one arrangement for respectively loading and unloading the shelves, and drive motors which serve for moving the pair of chains at a corresponding cycle frequency in a loading and an unloading regions, it being the case that the pair of chains has a horizontal section with a horizontally displaceable chain-deflecting means, and also, in order to avoid chain sagging, both an upper chain strand and a lower chain strand of this horizontal chain section are guided over their entire length by means of a chain-supporting profile which runs beneath the relevant chain in each case, characterized in that the upper chain-supporting profile of the horizontal chain section is subdivided into a plurality of moveably mounted segments which, depending on the current position of the displaceable chain-deflecting means, can be displaced out of their original position such that they thus provide the pair of chains moving upwards in the deflecting region with a gap through which the pair of chains can cross over the plane of the upper chain-supporting profile, after which it then rests on the same once more.

2. The article store according to claim 1, characterized in that the moveably mounted segments are actuated by directing means which are arranged on both sides of the displaceable chain-deflecting arrangement, are beveled at both ends, are fixedly connected to the displaceable chain-deflecting means and are thus capable, depending on the current position of this chain-deflecting means, of pushing aside a corresponding number of the abovementioned segments.

3. The article store according claim 1, characterized in that the abovementioned segments are retained in position by elastic pressure, preferably by means of compression springs, in order to permit temporary lateral displacement of the segments.

4. The article store according to claim 1, characterized in that the displaceably mounted deflecting arrangement of the horizontal chain section has its upper portion, running beneath the upper chain strand, extended such that, in that region in which the chain crosses over the plane of the upper chain-supporting profile, this extension can temporarily perform the chain-supporting function which has ceased as a result of the supporting segments being displaced.

5. The article store according to claim 1, characterized in that, in addition to the abovementioned horizontal section, the article store also has a vertical section coupled to the horizontal section, and a respectively vertically or horizontally displaceable deflecting arrangement is arranged in each case at the end of the respective vertical or horizontal section.

6. A deflecting arrangement for an endless, driven pair of chains which serves for transporting articles, is arranged on common axes in each case and on which the articles which are to be transported are suspended in gondolas which are mounted for swinging action and are deflected downwards at the upper end of a vertical chain-guidance section, characterized in that the gondolas are mounted on the chains by means of a crank-like suspension arrangement, of which the crank arm is mounted in a rotatable manner, on the one hand, on a chain-mounted bolt and, on the other hand, on a gondola-mounted bolt, and means are provided in order to displace the gondolas radially outwards by the length of the crank arm in the deflecting region and, consequently, to allow the gondolas to run through the deflecting region with a spacing between them which rules out the situation where adjacent gondolas impede one another.

7. The deflecting arrangement according to claim 6, characterized in that the two chain wheels are each connected in a rotationally rigid manner to a cam plate which is provided with recesses, the spacing between the latter being dimensioned such that, as the gondolas pass the abovementioned recesses, they are gripped by the latter on the gondola-mounted bolts of the suspension arrangement and thus, as the cam plate is rotated, are displaced radially outwards by the length of the crank arm.

8. The deflecting arrangement according to claim 6 in an article store where said article store comprises: a buffer zone between two processing arrangements, in particular between production and packaging, having an endless, guided pair of chairs on which gondolas, which are intended for temporarily storing the articles and are provided with shelves, are suspended for swinging action, having in each case one arrangement for respectively loading and unloading the shelves, and drive motors which serve for moving the pair of chains at a corresponding cycle frequency in the loading and unloading regions, it being the case that the pair of chains has a horizontal section with a horizontally displaceable chain-deflecting means, and also, in order to avoid chain sagging, both the upper chain strand and the lower chain strand of this horizontal chain section are guided over their entire length by means of a chain-supporting profile which runs beneath the relevant chain in each case, characterized in that the upper chain-supporting profile of the horizontal chain section is subdivided into a plurality of moveably mounted segments which, depending on the current position of the displaceable chain-deflecting means, can be displaced out of their original position such that they thus provide the pair of chains moving upwards in the deflecting region with a gap through which the pair of chains can cross over the plane of the upper chain-supporting profile, after which it then rests on the same once more.

9. The deflecting arrangement according to claim 7 in an article store where said article store comprises: a buffer zone between two processing arrangements, in particular between production and packaging, having an endless, guided pair of chairs on which gondolas, which are intended for temporarily storing the articles and are provided with shelves, are suspended for swinging action, having in each case one arrangement for respectively loading and unloading the shelves, and drive motors which serve for moving the pair of chains at a corresponding cycle frequency in the loading and unloading regions, it being the case that the pair of chains has a horizontal section with a horizontally displaceable chain-deflecting means, and also, in order to avoid chain sagging, both the upper chain strand and the lower chain strand of this horizontal chain section are guided over their entire length by means of a chain-supporting profile which runs beneath the relevant chain in each case, characterized in that the upper chain-supporting profile of the horizontal chain section is subdivided into a plurality of moveably mounted segments which, depending on the current position of the displaceable chain-deflecting means, can be displaced out of their original position such that they thus provide the pair of chains moving upwards in the deflecting region with a gap through which the pair of chains can cross over the plane of the upper chain-supporting profile, after which it then rests on the same once more.

* * * * *